United States Patent [19]
Murray et al.

[11] Patent Number: 6,119,475
[45] Date of Patent: Sep. 19, 2000

[54] TANK UNLOAD APPARATUS

[75] Inventors: Gary P. Murray, Montpelier; William C. Brown, Bryan; Walter D. Murray, Pioneer, all of Ohio

[73] Assignee: SPX Corporation, Muskegon, Mich.

[21] Appl. No.: 09/272,495

[22] Filed: Mar. 19, 1999

[51] Int. Cl.[7] .................................................. F25B 45/00
[52] U.S. Cl. ............................. 62/292; 177/130; 177/146
[58] Field of Search .............................. 62/292; 177/130, 177/146, 149, 154, 59, 229

[56] References Cited

U.S. PATENT DOCUMENTS

| | | |
|---|---|---|
| 4,261,178 | 4/1981 | Cain . |
| 4,363,222 | 12/1982 | Cain . |
| 4,364,236 | 12/1982 | Lower et al. . |
| 4,441,330 | 4/1984 | Lower et al. . |
| 4,878,356 | 11/1989 | Punches et al. .......................... 62/149 |
| 4,947,979 | 8/1990 | Martin et al. ........................ 198/343.1 |
| 5,127,239 | 7/1992 | Manz et al. . |
| 5,172,562 | 12/1992 | Manz et al. . |
| 5,181,391 | 1/1993 | Manz . |
| 5,182,918 | 2/1993 | Manz et al. . |
| 5,193,351 | 3/1993 | Laukhuf et al. . |
| 5,209,077 | 5/1993 | Manz et al. . |
| 5,231,842 | 8/1993 | Manz et al. . |
| 5,336,853 | 8/1994 | Davison .................................. 177/146 |
| 5,629,476 | 5/1997 | Sondey ..................................... 73/116 |
| 5,739,478 | 4/1998 | Zefira ..................................... 177/130 |
| 5,799,494 | 9/1998 | Wilson ................................. 62/292 X |

*Primary Examiner*—William Doerrler
*Assistant Examiner*—Chen-Wen Jiang
*Attorney, Agent, or Firm*—Price, Heneveld, Cooper, DeWitt & Litton

[57] ABSTRACT

A lift assembly which is coupled to a refrigerant service cart to raise and lock the supply tank of refrigerant off of a weight sensor, locking the tank in a raised position for transportation of the portable servicing cart. In a preferred embodiment, a fixed arm extends from the portable cart and is positioned at a location above the refrigerant tank. A movable connecting link extends from the arm and is coupled to the tank and is controlled by an over-center toggle with a control handle for raising and lowering the tank coupled to the link between a use position resting on the weight sensor and a transporting position engaging the fixed arm and locked thereto by the over-center toggle control.

23 Claims, 3 Drawing Sheets

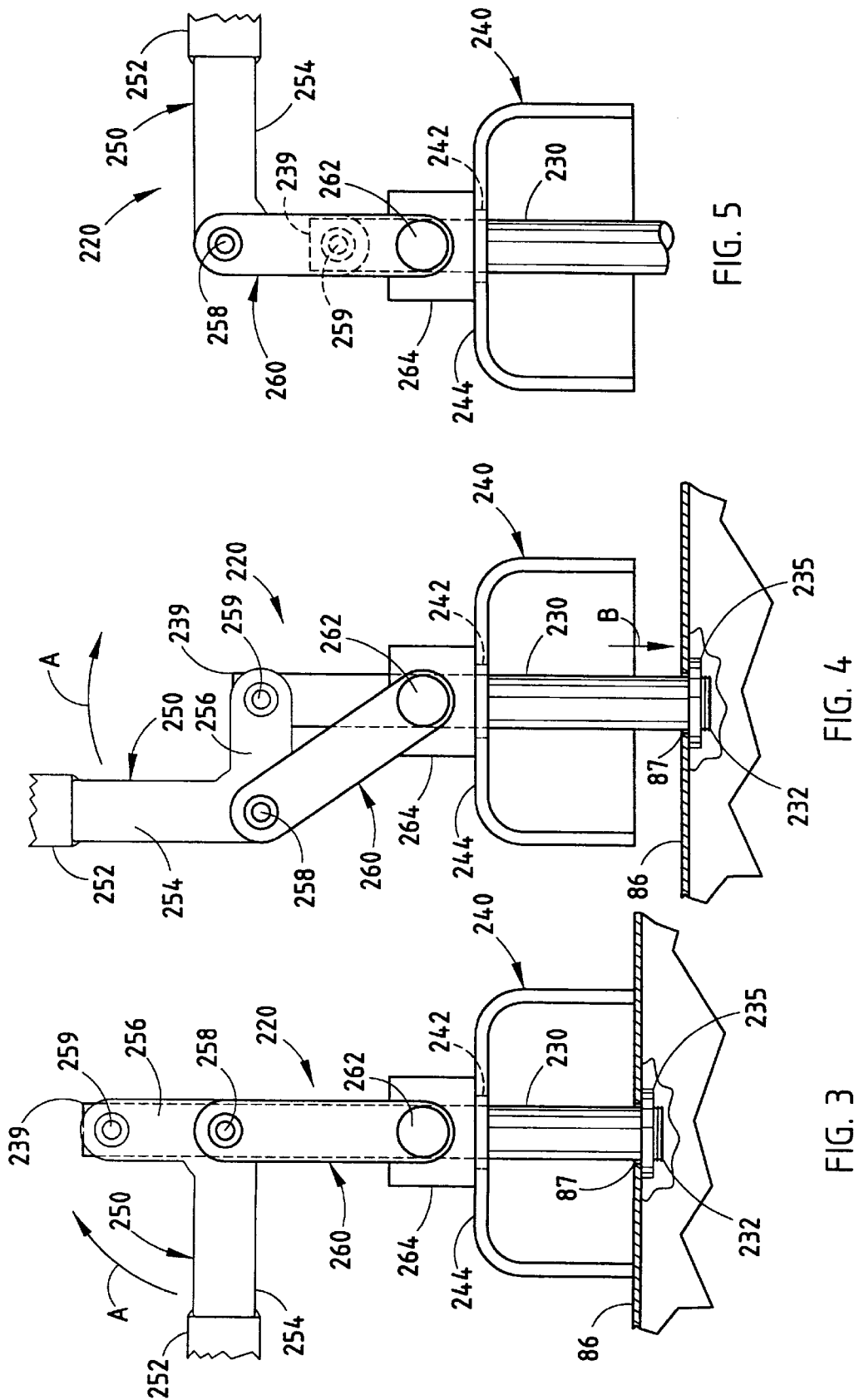

TANK UNLOAD APPARATUS

BACKGROUND OF THE INVENTION

The present invention relates to a portable service unit for servicing a refrigeration circuit and particularly to an apparatus for unloading a supply tank of refrigerant from a weight sensor when the service unit is being transported.

Portable carts are used in connection with servicing refrigeration circuits, such as the air conditioning unit of a vehicle. The portable machines include hoses which are coupled to the refrigeration circuit to be serviced. A vacuum pump and compressor operate to recover refrigerant from the vehicle's air conditioning unit, separate contaminants and oil from the recovered charge, flush the unit, and subsequently recharge the system from a supply of either recovered refrigerant and/or new refrigerant from a main refrigerant tank. U.S. Pat. No. 4,441,330 discloses one such apparatus.

In the past, when the supply of refrigerant would run low, a display system associated with the equipment would prompt the operator to connect an external tank and refill the refrigerant supply. This resulted in a time-consuming and potentially error-prone system by which a servicing cycle can be interrupted by the lack of adequate refrigerant or refrigerant could inadvertently escape to the atmosphere during the refilling of the refrigerant supply tank.

In order to overcome the problem with an interrupted supply of refrigerant, an automatic tank refilling system which detects the weight of refrigerant in a main tank and provides an auxiliary tank, which supplies refrigerant to the main tank when the main tank refrigerant becomes low, is disclosed in concurrently filed U.S. patent application Ser. No. 09/272789, filed concurrently herewith, entitled BACKGROUND TANK FILL, the disclosure of which is incorporated herein by reference. This improved system for maintaining refrigerant in the primary or main refrigerant supply tank relies upon the main tank resting upon a weight sensor such that the weight of refrigerant in the main tank can be monitored during a servicing cycle of a refrigeration circuit. In order to accurately measure the tank weight, the tank rests upon a weight sensitive detector such as a load cell which is a relatively sensitive device subject to misalignment, miscalibration or even damage when the portable cart to which the servicing apparatus is mounted is transported either from one vehicle to another or from one part of the service area to another.

There exists a need, therefore, for a system to protect the weight sensor, such as a load cell, incorporated to provide signals for controlling the level of refrigerant in the main refrigerant supply tank during movement of the servicing cart.

SUMMARY OF THE INVENTION

The system of the present invention provides such an apparatus by employing a lift assembly which is coupled to a portable refrigerant service cart and which can raise and lock the main supply tank of refrigerant off of the weight sensor, locking the tank in a raised position for transportation of the cart. In a preferred embodiment of the invention, a fixed arm extends from the portable cart and is positioned at a location above the main refrigerant tank. A movable connecting link extends from said arm and is coupled to the tank and is controlled by an over-center toggle with a control handle for raising and lowering the tank coupled to the link between a use position resting on the weight sensor and a transporting position engaging the undersurface of the fixed arm and locked thereto by the over-center toggle control.

Such structure can be easily controlled by the operator for preventing damage to the sensitive weight sensor during transportation of the service cart from one location to another and smoothly controls the motion of the tank from a use position resting on the load cell to an unloaded position locked in spaced relationship above the load cell. These and other features, objects and advantages of the present invention will become apparent upon reading the following description thereof together with reference to the accompanying drawings.

BRIEF DESCRIPTION OF THE DRAWINGS

FIG. 3 is an enlarged fragmentary front elevational view of the tank unload apparatus shown partly broken-away, showing the tank in the transportation position in which the tank is raised and locked in spaced relationship from the weight sensing platform;

FIG. 4 is an enlarged fragmentary front elevational view of the tank unload apparatus shown partly broken-away, showing moving of the tank from a raised transporting position toward a tank use position; and FIG. 5 is an enlarged fragmentary front elevational view of the tank unload apparatus shown in FIG. 2, shown with the apparatus in a lowered use position.

DETAILED DESCRIPTION OF THE PREFERRED EMBODIMENT

Figure 1:
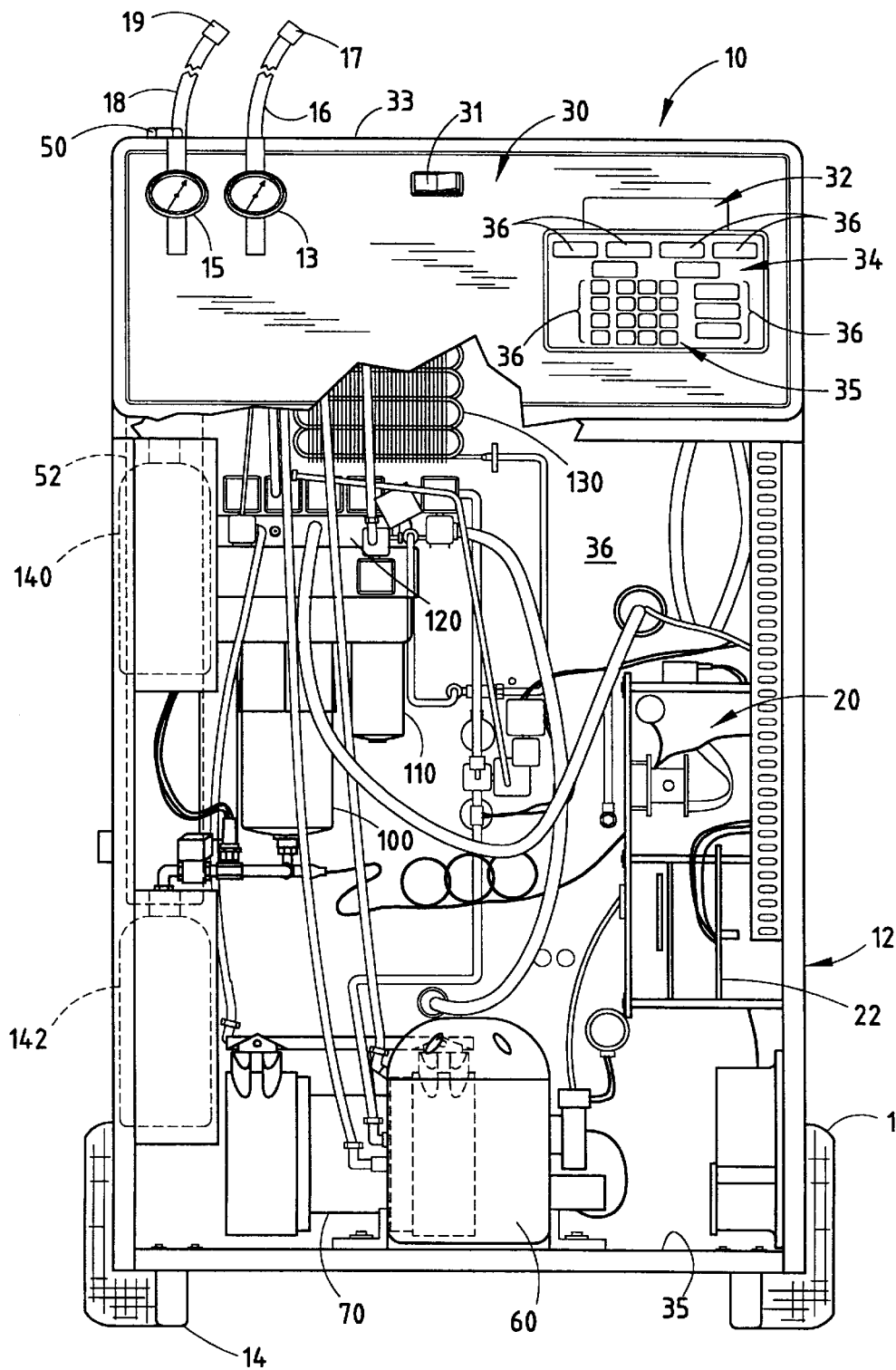
FIG. 1 is a front elevational view, partly broken away, of a refrigerant maintenance system for a vehicle which incorporates the present invention.

Referring initially to FIG. 1, there is shown a maintenance unit 10 for coupling to a refrigerant circuit such as a vehicle's air conditioning system for its maintenance. The unit 10 comprises a portable machine mounted within a cabinet 12 supported by a pair of wheels 14, such that it can be conveniently moved to the situs of a vehicle. Unit 10 includes a high pressure hose 16, typically color coded red, with a coupling 17 for coupling to the vehicle's high pressure port and a low pressure hose 18, typically color coded blue, having a coupling 19 for coupling to the low pressure port of the vehicle's refrigerant circuit. The front panel of the cabinet is shown broken away in FIG. 1 to show the major elements of the system.

The maintenance unit 10 includes an electronic module 20 integrally including a microprocessor on a circuit board 22 for controlling the electromechanical solenoid valves for receiving input information from the pressure sensors and control switches included on the control panel 30 shown in FIG. 1. The control panel 30 includes an on/off switch 31 and a display 32 for displaying the operational status of the machine operation, which display may be an LCD display or other suitable electronic display coupled to the microprocessor via a conventional input/output circuit. The display panel 30 further includes a switch panel 34 having a conventional keyboard 35 and a plurality of push-button switches 36 for controlling the operation of the machine through its various phases of operation and/or for selecting parameters for display. Thus, the keyboard 35 in conjunction with the operational switches 36 and display 32 allow the operator to enter the desired operational parameters for the machine according to manufacturer specifications for the servicing of an air conditioner unit in a particular vehicle.

The input hoses 16 and 18 are coupled to mechanical pressure gauges 13 and 15, respectively, which are mounted on the front panel of the service unit 10, as seen in FIG. 1. In addition, electrical pressure transducers are coupled to the hoses 16 and 18 and to the microprocessor through a conventional input/output circuit to provide the microprocessor with pressure information during operation of the unit. Gauges 13 and 15 provide the operator with a conventional analog display of the pressure as well. Mounted to the top surface 33 of cabinet 12 is a sight gauge 50 which also includes an integral replaceable filter cartridge 52 mounted to the cabinet for filtering particulate material from the refrigerant during the flushing cycle as described in greater detail below.

Mounted to the floor 35 of cabinet 12 is a compressor 60 and a vacuum pump 70. Behind the front of cabinet 12 on an extension 35' of floor 35, there is mounted the main tank 80 of refrigerant (FIG. 2) for the supply of refrigerant to the system. Also mounted adjacent the main tank 80 is a secondary supply tank 90 which supplies make-up refrigerant to the main tank 80 as described in greater detail below. Mounted to the inside of rear wall 36 of cabinet 12 is an oil accumulator tank 100, a compressor oil separator filter 110, a manifold 120 shown as a node in FIG. 2, and a condenser 130. In addition, a fresh oil canister 140 is mounted within a side compartment of cabinet 12. A recovery oil container 142 is mounted on the lower part of the cabinet to receive oil drained from the accumulator 100.

Figure 2:
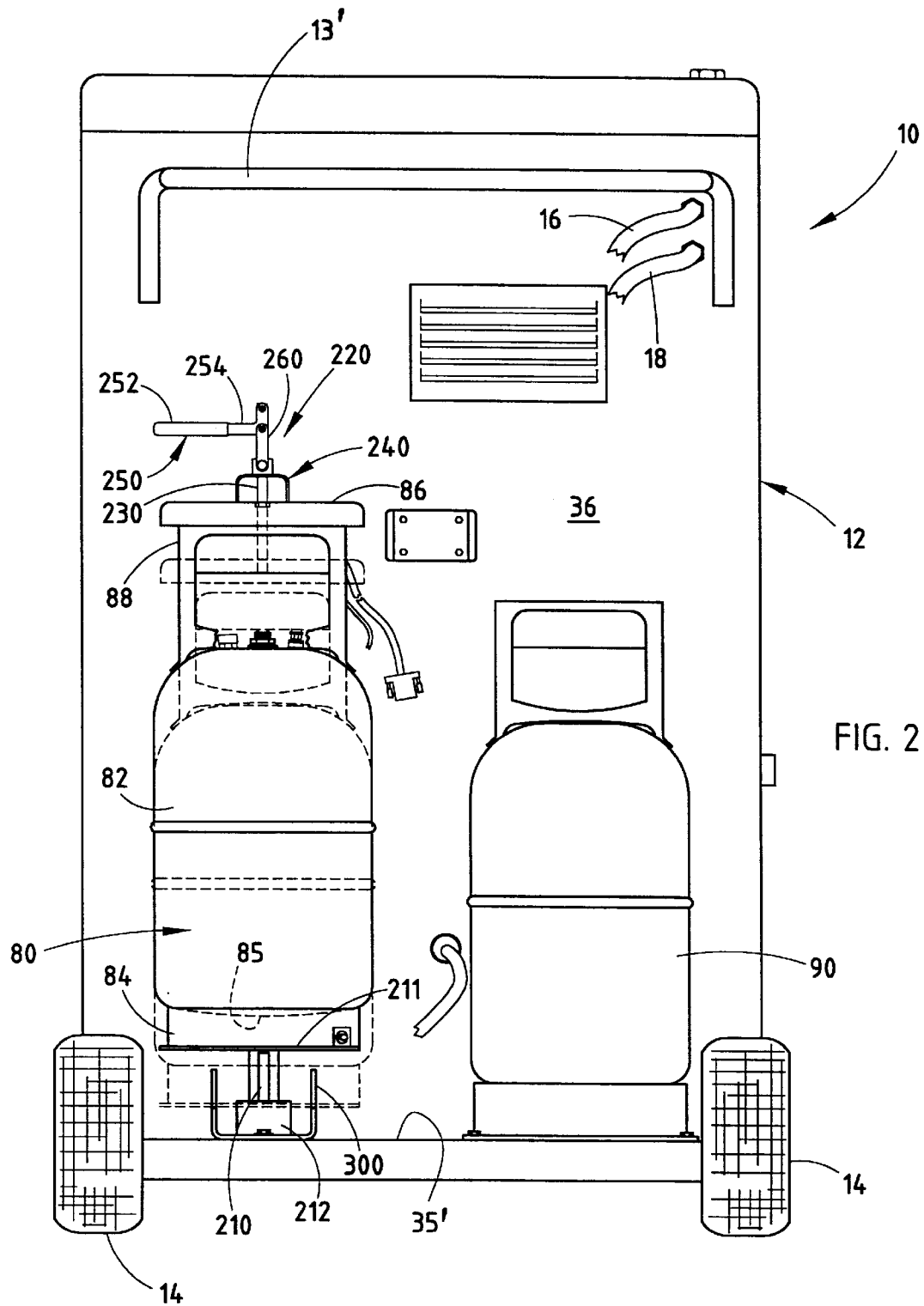
FIG. 2 is a rear elevational view of the service unit shown in FIG. 1.

Referring now to FIG. 2, there is shown the rear view of the service unit 10 in which the main supply tank 80 rests upon a rearwardly extending extension 35' of floor 35 on a load cell 210. The load cell provides a weight indicative signal to the microprocessor on circuit board 22 such that the weight of the tank comprising its tare weight plus the weight of refrigerant therein is monitored by the microprocessor to determine when additional refrigerant is needed. Tank 80 is mounted to the load cell 210 by a unique tank load-off assembly 220 which lifts and locks the tank in a raised position, shown in solid lines in FIG. 2 and in FIG. 3, spaced above the load cell during movement of the service unit 10 to prevent damage to the load cell and lowers the tank into a use position, shown in phantom lines in FIG. 2 and in FIG. 5, when the service unit 10 is stationary for use. The tank load-off assembly 220 is described in greater detail below.

Service unit 10 includes a handle 13' to facilitate movement of the service unit cart on wheels 14. Mounted adjacent the main refrigerant tank 80 is an auxiliary tank 90 which is plumbed to the main tank 80 utilizing conventional high pressure hoses and connectors together with control valves for coupling tank 90 to tank 80. The operation of the service unit 10 including the use of load cell 210 is described in detail in the above-identified patent application entitled BACKGROUND TANK FILL, the disclosure of which is incorporated herein by reference. For purposes of describing this invention, it is necessary only to understand that the weight sensor comprising the load cell 210 is somewhat fragile and sensitive to movement of tank 80. Having briefly described the major components of the refrigerant servicing unit 10 shown in FIGS. 1 and 2, a detailed description of the unload apparatus follows in connection with FIGS. 2–5.

As seen in FIG. 2, the floor extension 35' includes an upstanding U-shaped channel 300 surrounding the load cell 210 mounted to the floor extension 35' by a bracket 212. The channel 300 protects the load cell during installation and/or replacement of the tank 80 from lateral contact. Tank 80 is somewhat conventional comprising a cylindrical body 82 with a circular ring 84 extending below the bottom surface 85 of the tank which, when the tank is lowered in a position shown in phantom lines in FIG. 2, surface 85 engages the weight sensitive end 211 of load cell 210 such that the load cell supports the weight of the tank 80 and its contents. The tank 80 is coupled to the remaining components of the system through conventional flexible hoses allowing the movement of the tank from a lowered use position to a raised transporting position. Tank 80 is modified to include a transversely extending channel 86 welded to the top of the conventional carrying handle 88 of the tank and to which the unload assembly 220 is attached by, as best seen in FIGS. 3 and 4, a vertically extending movable link 230.

Unload assembly 220 is coupled to the rear wall of the cabinet 12 which includes a U-shaped channel defining an arm 240 which extends from the rear wall 36 of cabinet 12 and is welded to a suitable framework defining the skeleton of cabinet 12 sufficient to support the weight of tank 80 when in a raised position as seen in FIGS. 2 and 3. The arm defining channel 240 includes a central aperture 242 (FIGS. 3–5) through which the generally circular cross-sectional rod-shaped link 230 can movably extend under the control of the over-center toggle mechanism now described in connection with FIGS. 2–5.

The toggle mechanism comprises a generally L-shaped control handle 250 having a polymeric coated handle 252 to facilitate gripping and operation of the toggle. Handle 252 is on the elongated leg 254 of the L-shaped control handle 250 which includes a base leg 256. The junction of legs 254 and 256 of control handle 250 is pivotally mounted by a pivot pin 258 to a connecting intermediate link 260 having its opposite end pivotally coupled by a pivot pin 262 to a mounting boss 264 welded to the upper surface 244 of channel 240. The end of the L-shaped base leg 256 is pivotally mounted by a pivot pin 259 to the upper end 239 of link 230. When handle 252 is in the position shown in FIG. 3, link 260 aligns or is slightly over center with the pivot points 259 and 262, thereby locking the tank in such raised position, preventing movement of the link 230 without applying a force to the handle 252. When it is desired to lower the tank to the use position as shown in FIG. 5 and in phantom lines in FIG. 2, the handle 252 is rotated in the direction indicated by arrow A in FIGS. 3 and 4, pivoting the pivot axle 258 (to the left in these figures) out of line with pivot axles 259, 262, allowing the link 230 to be lowered in the direction indicated by arrow B in FIG. 4 until the handle 252 is rotated approximately 180° in which position the pivot axles 258, 259, and 262 again align, this time with pivot axle 259 below pivot axle 258 in the tank lowered position for use of the servicing apparatus 10, with the weight of the tank 80 now being positioned on the sensing end 211 of load cell 210.

The end of link 230 extends through an aperture 87 in the upper surface of channel 86 and has a threaded end 232. A threaded nut 235 and washer (not shown) are coupled to end 232 and engage the undersurface of channel 86 to allow the lifting of tank 80 when handle 252 is rotated in a direction opposite arrow A. Aperture 87 has a diameter larger than that of rod-shaped link 230 to allow the tank to freely disconnect from assembly 220 when in the lowered position shown in FIG. 2. The length of link 230 and the threading on end 232 is selected to provide the desired locking force with the tank in the raised position shown in FIG. 3. If desired, a spring and washer can be placed between threaded nut 235 and the undersurface of channel 86 between the link 230 and channel to allow for a predetermined locking force as a function of the spring constant selected.

Thus, with the tank unloading apparatus of the present invention, a service cart for providing refrigerant to a refrigeration circuit, such as a vehicle's air conditioning unit, is provided to allow the refrigerant tank to rest upon a weight-sensitive electronic sensor, allowing the tank to be off loaded during movement of the portable servicing apparatus during which time the tank could be jostled and cause damage to the weight sensor.

It will become apparent to those skilled in the art that these and other modifications to the preferred embodiment of the invention as described herein can be made without departing from the spirit or scope of the invention as defined by the appended claims.

The invention claimed is:

1. A tank unload apparatus for use in connection with a portable refrigerant servicing system having a tank for refrigerant which selectively rests upon a weight-sensitive sensor comprising:

a structural frame for the servicing apparatus, said frame including an arm extending therefrom in a position above the refrigerant tank;

a movable link extending from said arm for coupling to the tank; and a toggle assembly coupled to said link and movable to a first position for raising and locking the tank in a position above the weight sensor, said toggle movable to a second position lowering the tank onto the weight sensor for use of the apparatus.

2. The apparatus as defined in claim 1 wherein said toggle assembly includes a handle pivotally coupled at one end to said movable link.

3. The apparatus as defined in claim 2 wherein said toggle assembly further includes a intermediate link pivotally coupled at one end to said handle at a location remote from said one end of said handle and pivotally coupled at an opposite end to said arm.

4. The apparatus as defined in claim 3 wherein said handle is generally L-shaped.

5. The apparatus as defined in claim 4 wherein said movable link is generally rod-shaped.

6. The apparatus as defined in claim 5 wherein said arm includes an aperture formed therethrough and wherein said movable link extends through said aperture.

7. The apparatus as defined in claim 6 and further including a plate for attachment to the refrigerant tank, said plate including and aperture for receiving an end of said movable link remote from said handle.

8. The apparatus as defined in claim 7 wherein said second named end of said movable link is threaded and further including a threaded nut attached to said second named end of said movable link to attach said movable link to said plate.

9. The apparatus as defined in claim 8 wherein said plate is the top of a channel member.

10. The apparatus as defined in claim 9 wherein said arm comprises an channel member.

11. The apparatus as defined in claim 10 wherein said arm includes a mounting boss for pivotally mounting said opposite end of said intermediate link to said arm.

12. A tank unload apparatus for use in connection with a portable refrigerant servicing system comprising:

a portable cart;

a tank for refrigerant;

a platform on said cart for receiving said tank, said platform including a weight sensor onto which said tank is positioned during use for determining the weight of refrigerant in said tank;

an arm extending from said cart in a position above said tank;

a movable link extending from said arm and coupled to said tank; and a control coupled to said link and movable to a first position for raising and locking said tank in a position above said weight sensor, and to a second position lowering said tank onto said weight sensor for use of the apparatus.

13. The apparatus as defined in claim 12 wherein said control includes a handle pivotally coupled at one end to said movable link.

14. The apparatus as defined in claim 13 wherein said control further includes an intermediate link pivotally coupled at one end to said handle at a location remote from said one end of said handle and pivotally coupled at an opposite end to said arm.

15. The apparatus as defined in claim 14 wherein said handle is generally L-shaped.

16. The apparatus as defined in claim 15 wherein said movable link is generally rod-shaped.

17. The apparatus as defined in claim 16 wherein said arm includes an aperture formed therethrough and wherein said movable link extends through said aperture.

18. The apparatus as defined in claim 17 wherein said plate is the top of a channel member.

19. The apparatus as defined in claim 18 wherein said arm comprises an channel member.

20. The apparatus as defined in claim 19 wherein said arm includes a mounting boss for pivotally mounting said opposite end of said intermediate link to said arm.

21. The apparatus as defined in claim 12 and further including a plate coupled to said tank, said plate including and aperture for receiving an end of said movable link remote from said handle.

22. The apparatus as defined in claim 21 wherein said second named end of said movable link is threaded and further including a threaded nut attached to said second named end of said movable link to attach said movable link to said plate.

23. A method of handling a tank of refrigerant movably mounted to a portable service cart comprising the steps of:

lifting the tank from a support platform on said cart prior to movement of said cart;

locking the tank in a raised position above said platform during movement of the cart; and lowering the tank onto the platform for use.

* * * * *